May 14, 1968     J. D. OTTO     3,383,646
ELECTRICAL TERMINAL CLAMP
Filed July 1, 1966
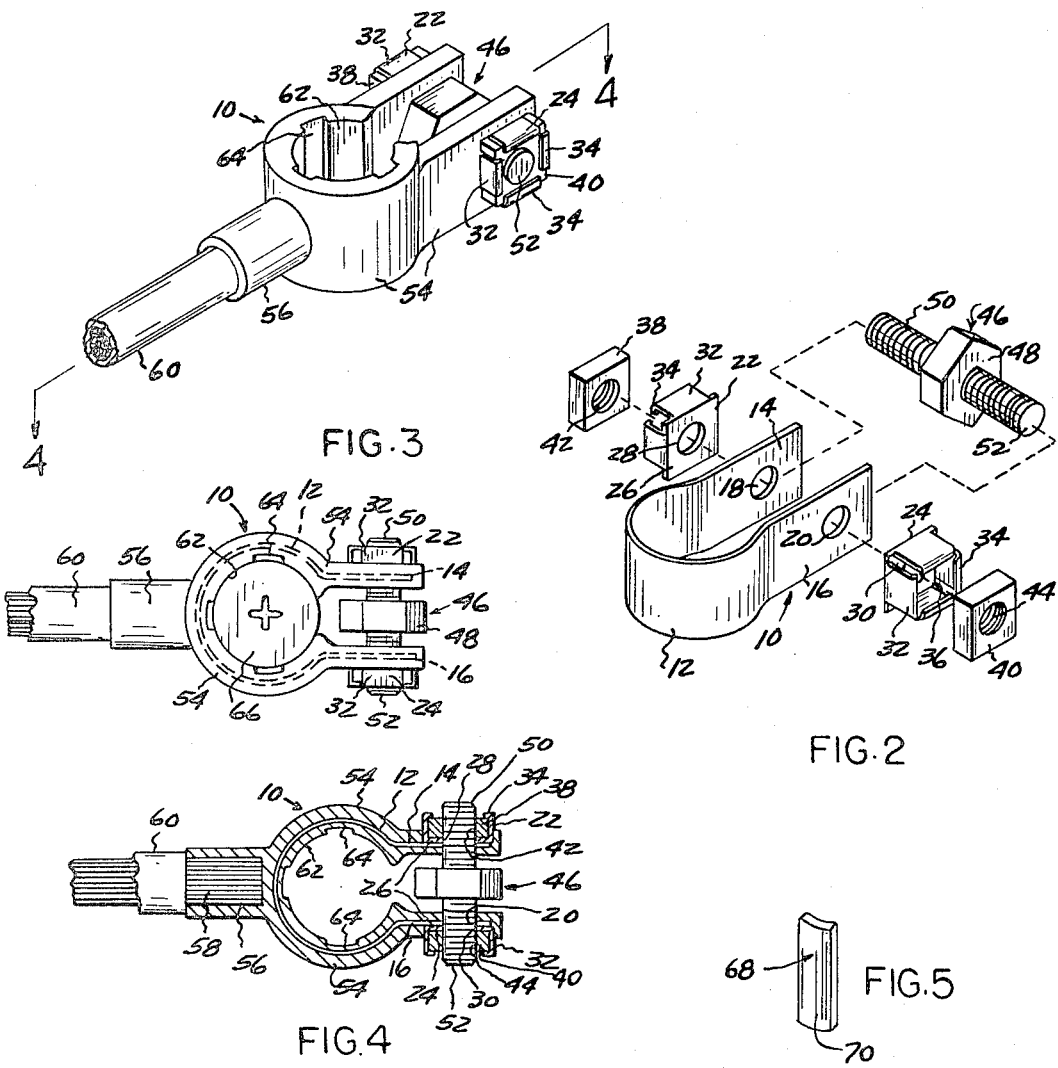
INVENTOR
JOHN D. OTTO
BY Claude A. Patalidis
ATTORNEY United States Patent Office 3,383,646
Patented May 14, 1968

3,383,646
ELECTRICAL TERMINAL CLAMP
John D. Otto, 22841 Shakespeare,
East Detroit, Mich. 48205
Filed July 1, 1966, Ser. No. 562,348
7 Claims. (Cl. 339—226)

ABSTRACT OF THE DISCLOSURE

An electric terminal clamp for connecting an electrical cable to a terminal post and having a soft metal annular clamp member imbedding a thin metallic spring member, the thin metallic spring member forming parallel extending ends on which are welded nut retainers holding non-corrosive nuts of opposite threads. A bolt having oppositely threaded ends engaging the nuts is rotatable in one direction to expand the clamp and in an opposite direction to contract the clamp around the terminal post. Additionally, the inner surface of the clamp may be provided with longitudinal slots, and electrolytic anti-corrosion metallic inserts are disposed in the slots.

---

The present invention relates generally to electrical terminal clamps, and more particularly to a battery terminal clamp or connector.

Battery terminal clamps used for connecting an electrical cable to the terminal posts of an electrical battery, specially of the lead-acid type, have not improved much over the years. As a result, terminal clamps of a conventional design are greatly susceptible to corrosion, are limited in their clamping action for providing mechanical attachment of an electrical cable to a battery terminal post while insuring adequate electrical contact and conduction therebetween. As a result of corrosion, it is often difficult to separate a battery cable clamp from a battery terminal post when the two elements have been connected even for a short period of time. It is often necessary to pry the clamp open by means of a special tool, and also it is often necessary to pull the clamp from the terminal by way of a tool substantially similar to a gear puller or the like, with the attendant inconveniences of resulting damages both to the clamp and to the battery terminal post.

There has been in the past a few attempts to remedy some of the disadvantages and shortcomings of conventional terminal battery clamps, generally by providing a bolt, nut and counternut arrangement for the means adopted to draw the terminal clamp in tight fit engagement with the surface of the battery terminal post, as disclosed in U.S. Patents 1,988,535 and 2,057,542. For some reasons, maybe due to the cost of manufacturing such terminal clamps, or due to some inconveniences in the design not known at the time the inventions were conceived, such battery terminal clamps have met with little commercial success, if any.

The principal object, consequently, of the present invention is to provide a positively locking electrical terminal clamp, particularly for connection of a battery terminal post with an electrical cable, insuring much improved mechanical and electrical connections as compared to terminal clamps commonly found on the market.

A further object of the invention is to provide a battery terminal clamp endowed with self-opening and self-closing features as a result of using a stud or bolt provided with opposite threads, so as to eliminate the necessity of prying open the clamp when it is desired to disconnect a battery cable from a battery terminal post.

A further object of the invention is to provide a battery terminal clamp having a hard metal thin skeleton or core capable of maintaining a neutral shape as well as giving strength to the terminal clamp, as opposed to more conventional clamps consisting exclusively of a molded lead or lead alloy split ring.

Another object of the present invention is to provide a battery terminal clamp having a great range of opening or closing to accommodate various sizes of battery terminal posts.

A further object of the present invention is to provide a battery terminal clamp provided with axially disposed slots on the inner surface of the clamp split ring made of a soft metal such as lead, so as to permit the clamp to conform to, and provide improved contact with the battery terminal post.

Still another object of the invention is to provide a battery terminal clamp which is substantially resistant to corrosion, which is easy to manufacture in production, which is reliable in service, which requires practically no maintenance, and which can be sold at a competitive price.

Other objects and advantages of the present invention will become apparent when the following description thereof is considered in conjunction with the attached drawings wherein like parts are designated by like numerals and in which:

FIG. 1 is a perspective veiw of a preferred example of electrical terminal clamp according to the present invention particularly adapted for use for connecting an electrical cable to a battery terminal post;

FIG. 2 is an exploded view of the terminal clamp of FIG. 1 showing the diverse elements entering into the combination, and showing the hard metal skeleton or core before coating or encasing in a soft metal such as lead;

FIG. 3 is a top plan view of the terminal clamp of FIG. 1, shown in position in clamping engagement with a battery terminal post;

FIG. 4 is a cross-sectional view of the terminal clamp of FIG. 1, as taken along an intermediate plane at right angle to the axis of the clamp ring and as seen from line 4—4 of FIG. 1, in the direction of the arrows; and FIG. 5 is an enlarged perspective view of an anti-corrosion insert useful in combination with the terminal clamp of the invention.

Referring now to the drawings, and more particularly to FIGS. 1–4 therein, an electrical terminal clamp according to the present invention particularly useful for attaching a battery cable to a battery terminal post, and designated generally by numeral 10, comprises a substantially thin, ring-like member 12, best seen in FIGS. 2 and 4, made preferably of metallic spring material and provided with a pair of extended straight end portions 14 and 16. A pair of unthreaded substantially aligned apertures 18 and 20 are disposed in the extended end portions 14 and 16, respectively, and each extended end portion is provided with a retainer clip member, as shown at 22 and 24, each having a bottom wall 26 provided with a substantially centrally located unthreaded aperture, as shown respectively at 28 and 30, which, at assembly, is disposed so as to correspond with the unthreaded aperture 18 or 20 in each of the extended end portions 14 and 16. The retainer clip members 22 and 24 are welded, or otherwise attached to the outside surface of the extended end portions 14 and 16, in the position indicated in the drawings, and the side wall 32 of each retainer clip member has an inwardly turned edge portion 34, so that each retainer clip member forms a recess or pocket 36 adapted to receive a nut, such as shown at 38 and 40, each adapted to be snugly engaged in each recess 36 and retained in position under the spring-back action of the side wall 32 so as to be held against rotation and securely maintained in the pocket by way of the bent edges 34 of the side walls. Each nut has a threaded bore, as shown at 42 and 44, the threaded bore 42 having a thread in an opposite direction to the thread of the threaded bore 44, one such threaded bore being a right hand thread and the other a left hand thread, for example.

Nuts 38 and 40 are preferably made of a non-corrosive material such as fiber, mica or the like, and a stud or bolt 46 having, for example, a square or hexagonal head 48 and two aligned oppositely projecting threaded members 50 and 52, is disposed such that, as seen in FIGS. 1, 3 and 4, threaded member 50, for example, is threaded into the internal bore 42 of nut 38, and threaded member 52 is threaded into the threaded bore 44 of nut 40, the threads of threaded members 50 and 52 being in opposite directions, and each being individually of the direction that conforms with the direction of the thread of the bores of its appropriate nut.

The assembly formed by thin split ring 12 and the retainer clip members 22 and 24 welded to the outside surface of extended end portions 14 and 16 is placed in a mold and a soft metal or alloy, such as lead or an alloy thereof, is poured and molded over the thin split metal ring 12 so as to provide a substantially uniform coating or casing 54 on at least the inner surface of the split ring 12 and the extended end portions 14 and 16, but preferably the coating or casing is molded upon both the inner and outer surfaces and the edge surfaces thereof of the split ring and integral end extensions. At the same time, the soft metal or alloy casing is also molded so as to provide for a socket 56 adapted to receive the end 58 of a stranded electrical cable 60. It is evident, however, that such a conection between the clamp of the invention and an electric cable could be different from the arrangement shown in the drawings, without departing from the spirit and scope of the invention, and that it could consist, for example, of a flat terminal nut and bolt attachment, spring clip arrangement, or any other well known conventional means.

The inner substantially cylindrical split surface 62 of the clamp is preferably provided with a plurality of slots, as shown at 64, so as to help the inner surface 62 to conform to different configurations and sizes of battery terminal posts, and to insure better mechanical and electrical contact therewith. In addition, upon clamping of the clamp upon a battery terminal post, such as shown at 66 in FIG. 3, the relatively soft surfaces of both the inner surface 62 of the clamp and the outer surface of the terminal post permit some limited deformation of the engaging surfaces causing the formation of shallow serrations on the terminal post surface corresponding to the slots 64 in the inner surface of the clamp, so as to provide a positive clamping action substantially resistant to rotational forces imposed upon the clamp relatively to the battery terminal post.

In order to mount the clamp of the invention upon the terminal post of a battery, the head 48 of stud 46 is rotated such as to spread apart the extended end portions 12 and 14 of soft metal coated hard metal split ring 12, thus increasing the internal diameter of the ring inner surface 62. The clamp is placed upon and around the battery terminal post, and head 48 of stud 46 is rotated in a direction that causes extended end portions 14 and 16 to be drawn together, such as to firmly engage the inner surface 62 of the clamp with the outer surface of the battery terminal post. When it is desired to remove the clamp from the battery terminal post, head 48 of stud 46 is rotated in a direction that causes the extended end portions 14 and 16 to be spread apart as the result of threaded members 50 and 52 rotating within the threaded bore 42 and 40 of nuts 38 and 44 and 40 respectively, the nuts being prevented from freely spreading apart in view of being firmly engaged in the recesses 36 of the spring retainer clip members 22 and 24 provided with side walls 32 having inwardly bent-over edges 34. Consequently, the clamp may be opened under the action only of stud 46, without the use of any auxiliary tools.

The thin hard metal core split ring 12 with its integral extended end portions 14 and 16 may be made such as it is normally neutral as far as spring bias is concerned. However, if it is so desired, the ring may be made such that there is normally a pre-stress or preload causing a bias tending to normally spread apart the extended end portions 14 and 16, so that the natural tendency of the extended end portions to spread apart aids in removing the clamp from a battery terminal post. It is, however preferable to make the thin hard metal split ring 12 with a spring-like natural tendency to occupy a predetermined neutral position. When the terminal clamp according to the invention is opened or closed away from such neutral position as a result of rotating stud 46 in one or another direction causing the extended end portions 14 and 16 to be drawn together or to be spread apart, the natural spring bias tendency of the thin hard metal split ring 12 to return to its neutral position creates a partially locking frictional load upon the engaging threads of threaded members 50 and 52 of stud 46 and of nuts 38 and 40, respectively.

Means may be provided in combination with the terminal clamp of the invention for preventing or retarding corrosion of both the clamp and the terminal post to which the clamp is normally attached by way of expendable electrodes of a metal, such as copper or the like, having preferred electrolytic affinity with the metals, such as lead, forming the terminal post and the clamp surfaces in engagement. An example of such an electrode is illustrated as electrode 68 of FIG. 5 provided with a laterally arcuate body portion 70 of a width, length and curvature adapted to enable it to be inserted in a groove 64 of the inner surface 62 of the clamp. When the electrode inserts 68 have corroded, the clamp may be loosened from the terminal post and new electrode inserts inserted in the grooves 64, thus providing continual anti-corrosion electrolytic protection of the clamp terminal post assembly.

It is evident that several adaptations and modifications of the terminal clamp according to the present invention are possible and will be readily apparent to those skilled in the art, without departing from the spirit and scope of the invention as hereinafter stated.

What is claimed as novel and is desired to be protected by United States Letters Patent is:

1. An electrical terminal clamp for connecting an electrical cable to a terminal post comprising a substantially thin metallic spring member shaped as a ring with substantially parallel extended end portions, an unthreaded aperture disposed in each of said extended end portions, said apertures being aligned with one another, a pair of nuts made of non-metallic non-corrosive material, one of said nuts having an internal thread of predetermined direction and the other of said nuts having an internal thread of opposite direction, a spring clip retainer welded to the outer surface of each of said extended end portions of the metallic spring member and forming a recess having an unthreaded aperture at the bottom thereof aligned with the aperture in said end portion, said recess being adapted to receive one of said nuts and to resiliently hold it in position against rotation and lateral displacement, a bolt disposed between said extended end portions and having oppositely extending threaded projections of opposite threads each adapted to extend through the aligned apertures in each of said extended end portions for threading through each nut, a substantially soft and non-corrosive metal coating at least the inner surface of the ring portion of said thin spring member, and means for securely attaching said electric cable to a portion of said terminal clamp for mechanical and electrical connection therewith.

2. The terminal clamp of claim 1 wherein the coating on at least the inner surface of the ring portion consists essentially of lead.

3. The terminal clamp of claim 1 wherein said coating completely encases said thin spring member.

4. The terminal clamp of claim 1 wherein said thin spring member has a natural tendency to return to a predetermined neutral shape for causing said extended end portions to exert a frictional action upon the engaged threads of said nuts and of said bolt threaded projections when said thin spring member is in any other than said neutral shape.

5. The terminal clamp of claim 1 wherein said nuts are made of a non-metallic material belonging to a group comprising fiber and mica.

6. The terminal clamp of claim 1 wherein said coating is provided with a plurality of axially extending slots for facilitating conforming of said coated ring to the outer shape of said terminal post upon drawing of said extended end portions toward each other.

7. The terminal clamp of claim 6 further comprising anti-corrosion metallic inserts engaged in said axially extending slots, said anti-corrosion inserts being made of a metal having electrolytic affinity with the metals of said terminal post and said terminal clamp.

References Cited

UNITED STATES PATENTS

| | | | |
|---|---|---|---|
| 1,420,435 | 6/1922 | Marko | 339—227 |
| 1,761,358 | 6/1930 | Mitchel. | |
| 1,808,330 | 6/1931 | Waltz | 339—227 |
| 1,837,814 | 12/1931 | Grunwald | 339—226 |
| 2,286,668 | 6/1942 | Brooke | 151—7 X |
| 2,299,291 | 10/1942 | Zam | 339—226 |
| 2,531,309 | 11/1950 | Thomas | 339—227 |
| 2,548,782 | 4/1951 | Goodnight | 339—228 |
| 2,751,571 | 6/1956 | Colyer | 339—228 |
| 2,935,726 | 5/1960 | Raymond | 339—231 |

MARVIN A. CHAMPION, *Primary Examiner.*

P. TEITELBAUM, *Assistant Examiner.*